US012767807B2

(12) United States Patent
Bai et al.

(10) Patent No.: US 12,767,807 B2
(45) Date of Patent: Oct. 20, 2026

(54) MODIFIED CROSS-LINKED POLYETHYLENE AND PREPARATION METHOD THEREFOR, AND RECYCLED PRODUCT AND PREPARATION METHOD THEREFOR

(71) Applicants: BEIJING ORIENTAL YUHONG WATERPROOF TECHNOLOGY CO., LTD., Beijing (CN); SICHUAN UNIVERSITY, Chengdu (CN)

(72) Inventors: Shibing Bai, Chengdu (CN); Yi Liao, Chengdu (CN); Wenfeng Duan, Chengdu (CN); Shuangxin Lai, Chengdu (CN); Shuangqiao Yang, Chengdu (CN); Hongmei Ding, Chengdu (CN); Ning Tan, Chengdu (CN); Yuqin Xiong, Beijing (CN); Yingchun Wang, Chengdu (CN)

(73) Assignees: BEIJING ORIENTAL YUHONG WATERPROOF TECHNOLOGY CO., LTD., Beijing (CN); SICHUAN UNIVERSITY, Chengdu (CN)

( * ) Notice: Subject to any disclaimer, the term of this patent is extended or adjusted under 35 U.S.C. 154(b) by 626 days.

(21) Appl. No.: 18/272,340

(22) PCT Filed: Jan. 12, 2022

(86) PCT No.: PCT/CN2022/071671

§ 371 (c)(1),
(2) Date: Jul. 13, 2023

(87) PCT Pub. No.: WO2022/152182

PCT Pub. Date: Jul. 21, 2022

(65) Prior Publication Data

US 2024/0309190 A1 Sep. 19, 2024

(30) Foreign Application Priority Data

Jan. 14, 2021 (CN) ......................... 202110048332.7

(51) Int. Cl.
*C08L 23/26* (2006.01)
*B29B 7/00* (2006.01)
(Continued)

(52) U.S. Cl.
CPC .............. *C08L 23/26* (2013.01); *B29B 7/007* (2013.01); *B29B 7/42* (2013.01); *B29B 7/46* (2013.01);
(Continued)

(58) Field of Classification Search
CPC .... B29B 7/72; B29B 7/42; B29B 9/06; B29B 7/007; B29B 7/84; B29B 7/46;
(Continued)

(56) References Cited

U.S. PATENT DOCUMENTS

| | | | | |
|---|---|---|---|---|
| 4,837,252 A * | 6/1989 | Seguin | C08J 3/005 | 524/68 |
| 2006/0249049 A1* | 11/2006 | Martin | C08L 95/00 | 524/68 |

FOREIGN PATENT DOCUMENTS

| | | |
|---|---|---|
| CN | 1066980 C | 4/2001 |
| CN | 1803435 A | 7/2006 |

(Continued)

OTHER PUBLICATIONS

International Search Report of PCT/CN2022/071671, mailed Mar. 30, 2022, 7 pages.

(Continued)

*Primary Examiner* — Monica A Huson
(74) *Attorney, Agent, or Firm* — COOPER LEGAL GROUP LLC

(57) ABSTRACT

The present invention provides a modified cross-linked polyethylene and a preparation method therefor, and a
(Continued)

recycled product and a preparation method therefor. The preparation method for the modified cross-linked polyethylene includes: milling waste cross-linked polyethylene by using a solid-phase force chemical reactor, and then using asphalt as a plasticizer for plasticization to obtain the modified cross-linked polyethylene. The plasticization treatment enables the decross-linked waste cross-linked polyethylene/asphalt material obtained after milling to have excellent processing fluidity, and thus, the decross-linked waste cross-linked polyethylene/asphalt material is suitable for preparing high-performance recycled products in various thermoplastic processing processes. The waste ultrafine cross-linked polyethylene powder subjected to asphalt plasticization can be formed in a compressive force field having a high pressure, and can also be suitable for thermoplastic extrusion processing of a low shear force field. The prepared recycled product has good mechanical properties.

11 Claims, 2 Drawing Sheets

(51) Int. Cl.

| | |
|---|---|
| ***B29B 7/42*** | (2006.01) |
| ***B29B 7/46*** | (2006.01) |
| ***B29B 7/72*** | (2006.01) |
| ***B29B 7/84*** | (2006.01) |
| ***B29B 9/12*** | (2006.01) |
| ***C08J 3/00*** | (2006.01) |
| *B29K 23/00* | (2006.01) |
| *B29K 105/00* | (2006.01) |
| *B29K 105/26* | (2006.01) |
| *B29K 309/00* | (2006.01) |

(52) U.S. Cl.

CPC .................. *B29B 7/72* (2013.01); *B29B 7/84* (2013.01); *B29B 9/12* (2013.01); *C08J 3/005* (2013.01); *B29K 2023/0691* (2013.01); *B29K 2105/251* (2013.01); *B29K 2105/26* (2013.01); *B29K 2309/00* (2013.01); *C08J 2323/06* (2013.01); *C08J 2495/00* (2013.01); *C08L 2207/20* (2013.01)

(58) Field of Classification Search

CPC ......... B29B 9/12; C08J 3/005; C08J 2495/00; C08J 2323/06; C08L 23/26; C08L 2207/20; Y02W 30/62; B29K 2105/26; B29K 2105/251; B29K 2309/00; B29K 2023/0691

See application file for complete search history.

(56) References Cited

FOREIGN PATENT DOCUMENTS

| | | | | |
|---|---|---|---|---|
| CN | 101143968 | A | | 3/2008 |
| CN | 102898768 | A | | 1/2013 |
| CN | 103044934 | A | | 4/2013 |
| CN | 103509356 | A | * | 1/2014 |
| CN | 103709770 | A | | 4/2014 |
| CN | 104385485 | A | | 3/2015 |
| CN | 109880389 | A | | 6/2019 |
| CN | 111662512 | A | | 9/2020 |
| CN | 111662521 | A | | 9/2020 |
| CN | 111844820 | A | | 10/2020 |
| GB | 2293174 | A | | 3/1996 |
| JP | 2008050534 | A | | 3/2008 |

OTHER PUBLICATIONS

Written Opinion of International Searching Authority of PCT/CN2022/071671, mailed Mar. 30, 2022, 8 pages.

Ding Guosheng, “Study on the flexural and tensile fatigue performance of cross-linked polyethylene modified surname asphalt mixes.” Road and Motor Transport, vol. 186, pp. 77-80 May 31, 2018.

Bu Yuxiang, “Study on the high temperature performance of cross-linked polyethylene modified surname asphalt mixes.”Traffic Technology, vol. 1, pp. 114-117. Feb. 28, 2018.

Fasen Sun, “Reuse of Pan-milled P-XLPE cable powder as additive for asphalt to improve thermal stability and decrease processing viscosity.” Construction and Building Materials, vol. 281, pp. 1-12 Apr. 26, 2021.

* cited by examiner

MODIFIED CROSS-LINKED POLYETHYLENE AND PREPARATION METHOD THEREFOR, AND RECYCLED PRODUCT AND PREPARATION METHOD THEREFOR

CROSS-REFERENCE TO RELATED APPLICATIONS

This application is a national stage application filed under 35 U.S.C. § 371, of International Patent Application No. PCT/CN2022/071671, filed Jan. 12, 2022, which claims the priority to Chinese Patent Application No. 202110048332.7, filed to China National Intellectual Property Administration on Jan. 14, 2021, each of which is incorporated by reference herein in its entirety.

Chinese patent application CN201410526660.3 (the publication number of which is CN 104385485 A), filed on Oct. 8, 2014, and Chinese patent ZL95111258.9, filed on Mar. 6, 1995, are also incorporated by reference herein in their entireties.

FIELD

The present invention relates to the technical field of recycling and reusing waste cross-linked polyethylene, and in particular, to a modified cross-linked polyethylene and a preparation method therefor, and a recycled product and a preparation method therefor.

BACKGROUND

Cross-linked polyethylene is a three-dimensional net structure of polyethylene formed by irradiation cross-linking, peroxide cross-linking, silane cross-linking, and the like using intermolecular covalent bond interactions. It has the characteristics of insoluble and infusible. The cross-linked polyethylene has excellent properties in heat resistance, stress cracking resistance, chemical corrosion resistance, wear resistance, creep resistance, mechanical property, and the like, and thus is widely used in the industries, including chemical industry, construction, automobile, machinery, electric power, package, and agriculture, in particular, used for preparing pipes and insulated wires and cables.

Obviously, the production of waste cross-linked polyethylene comes from the above technical field. For example, there are two main sources in the field of a cable material. The first one is a waste material in the synthesis and production processes. Due to the distinctiveness of cable production, the waste material at about 5% of product production will inevitably be produced during process debugging. The second one is the used cable material, i.e., the old cables replaced after reaching the service life, which are a very large amount of waste materials that cannot be reduced at all. Moreover, the thermoplastic processing cannot be performed on the three-dimensional net structure of the cross-linked polyethylene again, so that it is very difficult to recycle and reuse the waste material.

The waste cross-linked polyethylene should be a resource that has a high recycling value. According to the calculation, recycling 1 ton of waste cross-linked polyethylene is equivalent to reducing using 3-5 tons of oil, which is important for countries that lack native resources and rely heavily on imports for crude oil. According to the data of the National Bureau of Statistics of China, in 2019, crude oil imported to China was 505.72 million tons, increasing by 9.5% year on year, which is undoubtedly of great significance for national economy of China.

Currently, methods of treating the waste cross-linked polyethylene mainly include landfill, incineration, and decomposition.

Landfill method: due to the large occupation area, land use contradiction with urban construction is prominent, and the landfill cost is high. Most of the waste cross-linked polyethylene will be landfilled together with other urban solid wastes. The organic matters leaked from landfill 5 will pollute the water source and affect the underground ecological environment.

Incineration method: toxic gases produced by incinerating with other urban solid wastes can pollute the atmosphere, while the use of non-toxic treatment device for incineration needs a large investment and is costly (more than 2 billion Chinese yuan is required to build a large incineration plant).

Decomposition method: refers to the recycle of monomers, oligomers, and other raw materials from the waste cross-linked polyethylene by chemical reactions, such as pyrolysis or hydrolysis. However, the establishment of such a raw material recycle plant not only needs a large investment and cause serious pollution, but also can only treat clean waste materials. Therefore, the collection, transportation, separation/classification, and pre-treatment of waste cross-linked polyethylene have a high cost, high energy consumption, and low efficiency, so that the total operating cost in the recycle process exceeds the value of the output, and the value of recycling and reusing is not great. In China, most of the waste cross-linked polyethylene is recycled by the decomposition method, causing serious pollution to the environment. Therefore, this method is not highly recommended and has been banned.

Reuse and recycle are the most efficient and promising methods for treating the waste cross-linked polyethylene. In general, waste high molecular materials can be recycled and reused by solvent separation recycle, melt processing recycle, and solid-phase processing recycle. However, since the three-dimensional net structure of the waste cross-linked polyethylene material can neither dissolve nor melt, it is difficult to use the solvent separation recycle or the melt processing recycle, and thus the solid-phase processing recycle can only be used to recycle.

To provide a new technique for cleaner, efficient, and easy-to-implement solid-phase processing recycle and reuse of the waste cross-linked polyethylene, the applicant of the present invention disclosed a recycled material of waste cross-linked polyethylene and a recycling method thereof in an earlier application patent, “Recycled Material of Waste Cross-Linked Polyethylene and Recycling Method Thereof” (CN 104385485 A). The method includes: smashing waste cross-linked polyethylene into granular material of 0.5-2 cm, and then placing same into a solid-phase force chemical reactor for milling. During the milling, the temperature of cooling circulating water is controlled at 5-30° C., the milling pressure is 10-50 MPa, and the milling rotation speed is 10-1000 rpm. The milling times are 5-30 times, the material is milled into a powder with a particle size of 100-500 mesh, and a gel content is <60% as measured by a Soxhlet extraction apparatus.

The method provided in the present invention can selectively cut C—O bonds and Si—O bonds in the waste cross-linked polyethylene, disconnect the cross-linked bonds of the three-dimensional cross-linked structure, and change the original insoluble and infusible characteristics. Besides, it can improve the thermoplasticity and melt flowability of the material and re-impart thermoplastic processability to the recycled material of the waste cross-linked polyethylene, so that the obtained recycled material can be used to prepare high-value recycled materials and products with excellent properties by conventional thermoplastic processing methods, such as extrusion or calendaring.

However, the inventors of the present invention have found in the actual implementation of the above patent technology that, although the waste cross-linked polyethylene is milled using the solid-phase force chemical reactor to achieve a certain degree of decross-linking of the waste cross-linked polyethylene, the powder obtained by milling exhibits decross-linked on the outer surface of the particles and remains in a cross-linked state inside, resulting in a state of particle flow during the thermoplastic processing of the powder. Therefore, although the waste cross-linked polyethylene has a certain thermoplastic processability, its flowability can only be marginally processed under the action of a high shear force field. However, the single-screw direct extrusion molding with a low shear force field and the vulcanizing pressure plate technology without a shear force field both show poor mechanical properties. The application way and product performance of direct extrusion molding as sheet material were not mentioned in its application examples.

In addition, in the implementation of the above patent technology, it is also found that even if it is disclosed according to the application examples that a particle is produced by firstly extruding using a twin-screw extruder with a high shear force field and then formed by hot pressing, the processed product can only be small pieces of discontinuous sheet materials. The product cannot be continuously processed in large amounts in practical production, thus greatly limiting the application range thereof.

SUMMARY

In view of the above problems present in the related art, the present invention provides a modified cross-linked polyethylene and a preparation method therefor, and a recycled product and a preparation method therefor. The method mills waste cross-linked polyethylene by using a solid-phase force chemical reactor, and then uses asphalt as a plasticizer for plasticization to obtain the modified cross-linked polyethylene, wherein the plasticization treatment enables the partial decross-linked waste cross-linked polyethylene/asphalt material obtained after milling to have excellent processing fluidity, and thus is suitable for preparing high-performance recycled products in various thermoplastic processing processes.

To achieve the above objectives, the present invention is implemented using technical solutions in four aspects composed of the following technical measures.

In a first aspect, the present invention provides a preparation method for a modified cross-linked polyethylene, including the steps of:

(1) obtaining an ultrafine cross-linked polyethylene powder; and (2) adding natural liquid asphalt and the ultrafine cross-linked polyethylene powder obtained in step (1) into an internal mixer for mixing to obtain the modified cross-linked polyethylene.

Preferably, step (1) specifically includes: adding the cross-linked polyethylene powder into a millstone-type solid-phase force chemical reactor for milling; and collecting the ultrafine cross-linked polyethylene powder after milling.

Preferably, process parameters of the millstone-type solid-phase force chemical reactor in step (1) are: milling pressure of 2-3 MPa: a surface temperature of a millstone controlled at 25-35° C. by introducing a circulating cooling liquid; milling for 13-15 cycles; and a rotation speed of the millstone at 30-50 rpm.

In particular, the millstone-type solid-phase force chemical reactor is the force chemical reactor disclosed in the applicant's prior Chinese patent ZL95111258.9. Generally, the process of the above circulating milling is actually operated as: after the mixture material is milled by the millstone-type force chemical reactor, the material end product is collected and then placed in the millstone-type force chemical reactor again for milling. The above process is considered as circulating milling once.

Preferably, in step (1), the surface temperature of the millstone is controlled at 25-35° C. by introducing the circulating cooling liquid, and the cooling liquid is water, ethylene glycol or glycerol.

Preferably, process parameters of the internal mixer in step (2) are: a mixing temperature controlled at 180-200° C.: a rotation speed controlled at 30-50 rpm; time controlled at 10-30 min; and a mass ratio of the natural liquid asphalt to the ultrafine cross-linked polyethylene powder being (0.1-0.3):(0.9-0.7).

Preferably, the natural liquid asphalt in step (2) is selected as natural liquid asphalt having a penetration of 50-120 (0.1 mm), a softening point of 42-49° C., a flash point ranging between 240° C. and 260° C., and a ductility of 120-180 cm.

Preferably, the natural liquid asphalt in step (2) is commercial 90 #liquid asphalt.

Preferably, the cross-linked polyethylene powder is a waste cross-linked polyethylene powder, and a preparation method for the waste cross-linked polyethylene powder includes: selecting a waste cross-linked polyethylene material or product with a proportion of the cross-linked polyethylene being not less than 98%; and smashing the material or product to the waste cross-linked polyethylene powder with an average particle size being not more than 1 mm after pretreatment, including washing.

Specifically, the waste cross-linked polyethylene material or product includes a large amount of industrial wastes, such as waste materials generated during the synthesis and production of cables, waste cables, liquid conveying pipelines, pipelines of a refrigeration system, and pipes for a ground heating system. Those skilled in the art can query the specifications of the waste cross-linked polyethylene material or product to determine whether it complies with the rules to be selected as the raw material of the present invention.

Specifically, the pre-treatment of washing the waste cross-linked polyethylene material or product is mainly to remove impurities on the surface of the waste cross-linked polyethylene material or product. If necessary, the part of the non-cross-linked polyethylene also needs to be removed. Those skilled in the art can perform specific treatments according to the related art based on the actual situation of the waste cross-linked polyethylene material or product to be recycled and reused.

Specifically, smashing the material to the waste cross-linked polyethylene powder with an average particle size being not more than 1 mm may be carried out by an existing, conventional smashing device, such as a jaw crusher, a planetary ball mill, and a cryogenic ball mill.

Preferably, the smashing is smashing to the waste cross-linked polyethylene powder with an average particle size being not more than 500 μm.

In a second aspect, the present invention provides a modified cross-linked polyethylene prepared by natural liquid asphalt and an ultrafine cross-linked polyethylene powder as raw materials.

Preferably, a mass ratio of the natural liquid asphalt to the ultrafine cross-linked polyethylene powder is (0.1-0.3):(0.9-0.7).

Preferably, a method for preparing the modified cross-linked polyethylene by the natural liquid asphalt and the ultrafine cross-linked polyethylene powder as the raw materials is the preparation method for a modified cross-linked polyethylene.

In a third aspect, the present invention provides a preparation method for a recycled product, including the steps of:

smashing a modified cross-linked polyethylene to obtain a composite granular material; and performing thermoplastic processing on the composite granular material to prepare the recycled product.

The modified cross-linked polyethylene is prepared by the preparation method for a modified cross-linked polyethylene.

Preferably, the modified cross-linked polyethylene is smashed to the composite granular material with an average particle size being 0.5-1 cm. In particular, the smashing may be carried out by an existing, conventional smashing device, such as a jaw crusher, a planetary ball mill, and a cryogenic ball mill.

Preferably, the thermoplastic processing includes extruded profile processing, injection molding processing, or calendaring.

Preferably, the thermoplastic processing is specifically:

performing single-screw sheet extrusion processing on the composite granular material, process parameters of the sheet extrusion processing including: temperatures of three zones being a first zone of 150° C., a second zone of 175° C. and a third zone of 180° C., a hand piece of 175° C., a rotation speed controlled at 50-100 rpm and a die width of 10 cm;

or is performing twin-screw extrusion processing on the composite granular material, process parameters of the extrusion processing including: a die width of 30 cm, a first zone of 150° C., a second zone of 175° C., a third zone of 180° C., a hand piece of 175° C. and a rotation speed controlled at 50-100 rpm;

or is performing vulcanizing pressure plate processing on the composite granular material, process parameters including: a temperature of 180° C., pressure of 10 MPa, degassing for 5 times, hot pressing for 5 minutes and cold pressing to a room temperature under pressure of 10 MPa;

or is performing injection molding processing on the composite granular material, process parameters including: a temperature of a first zone of 160° C., a temperature of a second zone of 190° C., a temperature of a third zone of 190° C. and a temperature of a fourth zone of 190° C.

In a fourth aspect, the present invention provides a recycled product prepared by the preparation method for a recycled product.

It should be noted that the inventors of the present invention have found that the waste ultrafine cross-linked polyethylene powder obtained after milling by the millstone-type solid-phase force chemical reactor has excellent processing fluidity by plasticizing it with asphalt. In the surface molten particle flow, the asphalt containing a variety of organic small molecules acts as the plasticizer, and the small molecules are inserted among the molten particles, which weakens the attractive force between molecular chains, increases the distance among them, and plays a lubricating role. Besides, it reduces the melt viscosity and increases the possibility of particle movement.

The waste ultrafine cross-linked polyethylene powder subjected to asphalt plasticization can be formed in a compressive force field having a high pressure, and can also be suitable for thermoplastic extrusion processing of a low shear force field. The prepared recycled product has good mechanical properties. In addition, continuous sheet material with large diameters may be prepared by thermoplastic processing because the waste ultrafine cross-linked polyethylene powder after asphalt plasticizing forms a particle flow with a lubricating effect. The force between the particles enables the minimum movement units to move mutually in the condition of elevated temperature, and can be closely arranged to form a large sheet material. It is unlike an unlubricated powder, which has an unsmooth flow and fails to have good fluidity under the action of shear, thereby failing to continuously form. In this way, secondary processing may be performed on the waste powder, and the ability to be processed into a high-value product may be imparted on such a worthless material, both solving the environmental problems of the waste on a large scale and increasing the value of the product for unexpected profit.

It is important to note that the mass ratio of natural liquid asphalt to the waste ultrafine cross-linked polyethylene powder has an important influence on the ease of thermoplastic processing and the properties of the recycled product obtained by processing. With the increase of the added amount of the natural liquid asphalt, the torque decreases accordingly during the mixing. The smaller the acting force between particle flows is, the easier the processing is. However, when the added amount of the natural liquid asphalt is too high, the following disadvantages may occur: firstly, it can be clearly observed that there is incomplete mixing of the asphalt and the powder during the mixing, and the excess asphalt which does not enter the powder gap remains on the wall of the internal mixer cavity: secondly, since the asphalt content is too high, and the acting force between particles is too small, the viscosity is too low, and the mechanical property of the sheet material is poor. The sheet material becomes a material with low strength and toughness and has no use value. Therefore, the inventors of the present invention have found through controlled experiments that when the mass ratio of the natural liquid asphalt to the waste ultrafine cross-linked polyethylene powder is defined as (0.1-0.3):(0.9-0.7), the recycled products prepared by the thermoplastic processing have better comprehensive properties. When the mass ratio of the natural liquid asphalt to the waste cross-linked polyethylene ultra-fine powder is less than 0.1:0.9, a high shear force field is still required for successful processing; when the mass ratio of the natural liquid asphalt to the waste ultrafine cross-linked polyethylene powder is higher than 0.3:0.7, the asphalt cannot be well mixed with the powder, and the mechanical properties of materials decline significantly after processing.

According to the preferred technical solutions described above, after processing by the single-screw sheet extrusion, the obtained recycled board is tested to have a tensile strength of 20.3 MPa and a breaking elongation of 610%.

The present invention has the following beneficial effects.

(1) The technical solution of the present invention mills waste cross-linked polyethylene by using a solid-phase force chemical reactor, and then using asphalt as a plasticizer for plasticization, which enables the partial decross-linked waste cross-linked polyethylene/asphalt material obtained after milling to have excellent processing fluidity, and thus suitable for preparing high-performance recycled products in various thermoplastic processing processes.

(2) The technical solution of the present invention uses the waste cross-linked polyethylene as a main raw material, which is different from the way of adding the smashed waste cross-linked polyethylene in a small amount as a filler to prepare a recycled product in the existing recycling and reusing technologies, so that the waste cross-linked polyethylene can be recycled and reused more efficiently.

(3) The technical solution of the present invention defines selecting the very low-cost asphalt as a plasticizer and has a good technical effect, further reducing the overall cost of recycling and reusing the waste cross-linked polyethylene, and providing inspiration for the future recycle and reuse of the waste cross-linked polyethylene.

(4) The technical solution of the present invention is not only simple in operation, low in recycle cost and easy to produce on a large scale, but also provides a new way for recycling the waste cross-linked polyethylene without any waste and secondary pollution in the recycle process.

DETAILED DESCRIPTION

Figure 1:
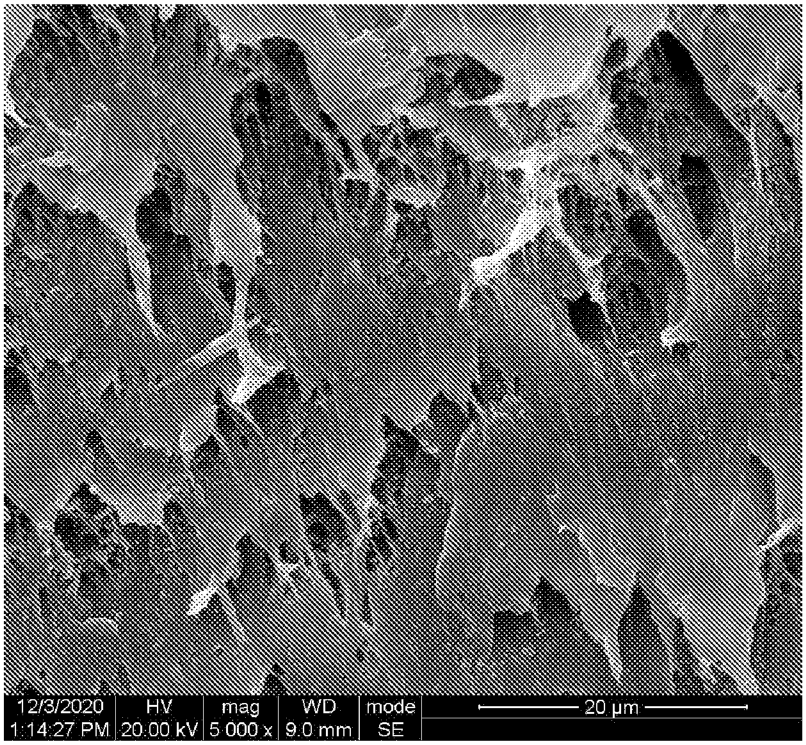
FIG. 1 is a SEM diagram of a recycled product prepared according to example 1 of the present invention after being etched with cyclohexane. It is apparent that a waste ultrafine cross-linked polyethylene powder has good compatibility with natural liquid asphalt in a recycled product, and the asphalt can be uniformly dispersed in the waste ultrafine cross-linked polyethylene powder to play a plasticizing and lubricating role.
Figure 2:
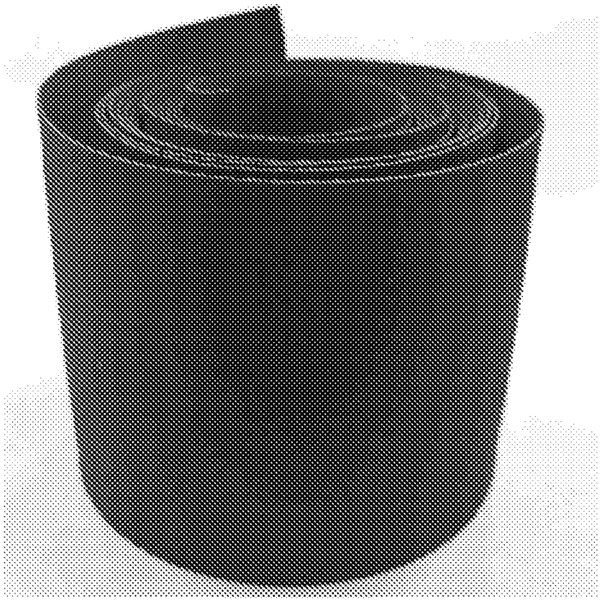
FIG. 2 is a picture of a recycled product prepared according to example 1 of the present invention. It is apparent that the present invention can produce a continuously extruded sheet material with a smooth surface after single-screw sheet extrusion processing in a condition of a low shear force field.
Figure 3:
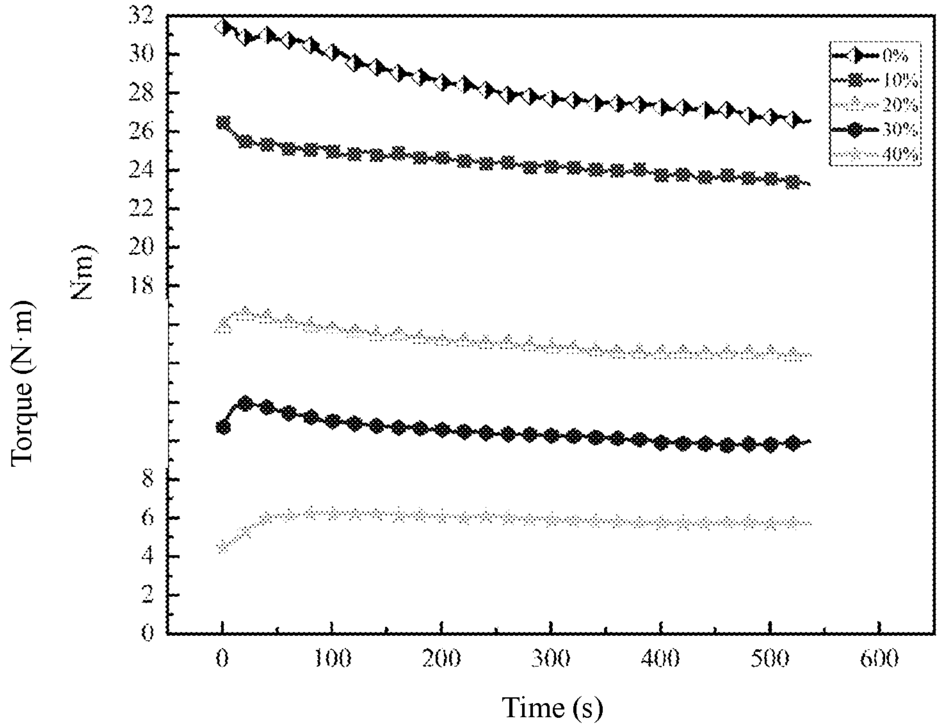
FIG. 3 is a diagram comparing torque rheology curves of recycled products prepared according to examples 1, 3 and 5 as well as comparative examples 1 and 2 of the present invention. It is apparent that compared with the comparative example 1 without adding asphalt, the technical solution of the present invention adds asphalt to toughen. The processing fluidity becomes better, and the torque decreases from 30 Nm to 6 Nm with the addition of asphalt during the mixing. In the condition that the rotation speed of the mixing is constant, the torque reflects the ease of thermoplastic processing. The lower the torque indicates that the shear force required for the mixing is lower, the powder is easier to process, and the acting force between particle flows is smaller. It fully reflects the plasticizing effect of asphalt in the material. 0%, 10%, 20%, 30%, and 40% therein refer to the added amount of the asphalt.
Figure 4:
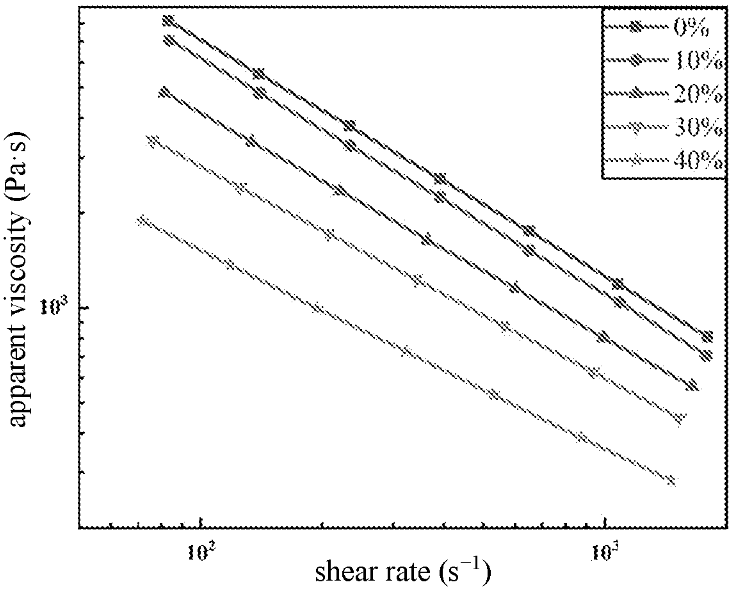
FIG. 4 is a diagram comparing high pressure capillary rheology of recycled products prepared according to examples 1, 3 and 5 as well as comparative examples 1 and 2 of the present invention. It is apparent that with the increase of asphalt, the apparent viscosity of the composite material gradually decreases, and the flow property increases at a shear rate, so that the thermoplastic processing can be better performed. It also indicates that the asphalt has a good toughening effect on the waste cross-linked polyethylene powder. 0%, 10%, 20%, 30% and 40% therein refer to the added amount of the asphalt.

The present invention will be further described by the examples in conjunction with the accompanying drawings. It should be noted that the given examples should not be construed as limiting the scope of the present invention, and that insubstantial modifications and adaptations to the present invention made by those skilled in the art according to the present invention are intended to be included within the scope of the present invention.

In the following examples, the tensile strength and breaking elongation were obtained by performing a regular tensile test on experimental samples according to the testing standard ASTM D638. Tensile strength was tested at a tensile speed of 50 mm/min.

In the following examples, 90 #liquid asphalt was purchased from Liaoning Hualu Special Asphalt Co. Ltd.

The waste cross-linked polyethylene was obtained from the samples provided by TBEA Deyang Cable Co. Ltd., and the proportion of the cross-linked polyethylene was 98%.

Example 1

The method for preparing a modified cross-linked polyethylene and a recycled product using waste cross-linked polyethylene and asphalt in the present example includes the following steps.

(1) A waste cross-linked polyethylene material was selected, and the material was smashed to the waste cross-linked polyethylene powder with an average particle size being not more than 1 mm after pretreatment, including washing.

(2) The waste cross-linked polyethylene powder was added into a millstone-type solid-phase force chemical reactor for milling, and a waste ultrafine cross-linked polyethylene powder was collected after milling. Process parameters of the millstone-type solid-phase force chemical reactor are: milling pressure of 3 MPa: a surface temperature of a millstone controlled at 28° C. by introducing a circulating cooling liquid; milling for 15 cycles; a rotation speed of the millstone at 50 rpm; and the cooling liquid being water, ethylene glycol or glycerol.

(3) Natural liquid asphalt and the waste ultrafine cross-linked polyethylene powder obtained in step (2) were added into an internal mixer for mixing to obtain the modified cross-linked polyethylene. Process parameters of the internal mixer are: a mixing temperature controlled at 180° C.: a rotation speed controlled at 50 rpm; time controlled at 10 min; and a mass ratio of the natural liquid asphalt to the waste ultrafine cross-linked polyethylene powder being 0.2: 0.8.

(4) The modified cross-linked polyethylene obtained after the mixing in step (3) was smashed to a composite granular material with an average particle size being 0.5-1 cm.

(5) Single-screw sheet extrusion processing was performed on the composite granular material obtained in step (4) to prepare the recycled product in a form of a sheet material. Process parameters of the sheet extrusion processing are: temperatures of three zones being a first zone of 150° C., a second zone of 175° C. and a third zone of 180° C., a hand piece of 175° C., a rotation speed controlled at 100 rpm, and a die width of 10 cm.

The mechanical property test was performed on the finally prepared recycled product described above as a sample. The tensile strength was 20.3 MPa, and the breaking elongation was 610%.

Example 2

The method for preparing a modified cross-linked polyethylene and a recycled product using waste cross-linked polyethylene and asphalt in the present example includes the following steps.

(1) A waste cross-linked polyethylene material was selected, and the material was smashed to the waste cross-linked polyethylene powder with an average particle size being not more than 1 mm after pretreatment, including washing.

(2) The waste cross-linked polyethylene powder was added into a millstone-type solid-phase force chemical reactor for milling, and a waste ultrafine cross-linked polyethylene powder was collected after milling. Process parameters of the millstone-type solid-phase force chemical reactor are: milling pressure of 3 MPa: a surface temperature of a millstone controlled at 28° C. by introducing a circulating cooling liquid; milling for 15 cycles; and a rotation speed of the millstone at 50 rpm.

(3) Natural liquid asphalt and the waste ultrafine cross-linked polyethylene powder obtained in step (2) were added into an internal mixer for mixing to obtain the modified cross-linked polyethylene. Process parameters of the internal mixer are: a mixing temperature controlled at 180° C.: a rotation speed controlled at 50 rpm; time controlled at 10 min; and a mass ratio of the natural liquid asphalt to the waste ultrafine cross-linked polyethylene powder being 0.2: 0.8.

(4) The modified cross-linked polyethylene obtained after the mixing in step (3) was smashed to a composite granular material with an average particle size being 0.5-1 cm.

(5) Vulcanizing pressure plate processing was performed on the composite granular material obtained in step (4) to prepare the recycled product in a form of a sheet material. Process parameters are: a temperature of 180° C., pressure of 10 MPa, degassing for 5 times, hot pressing for 5 minutes, and cold pressing to a room temperature under pressure of 10 MPa.

The mechanical property test was performed on the finally prepared recycled product described above as a sample. The tensile strength was 19.2 MPa, and the breaking elongation was 560%.

Example 3

The method for preparing a modified cross-linked polyethylene and a recycled product using waste cross-linked polyethylene and asphalt in the present example includes the following steps.

(1) A waste cross-linked polyethylene material was selected, and the material was smashed to the waste cross-linked polyethylene powder with an average particle size being not more than 1 mm after pretreatment, including washing.

(2) The waste cross-linked polyethylene powder was added into a millstone-type solid-phase force chemical reactor for milling, and a waste ultrafine cross-linked polyethylene powder was collected after milling. Process parameters of the millstone-type solid-phase force chemical reactor are: milling pressure of 3 MPa: a surface temperature of a millstone controlled at 28° C. by introducing a circulating cooling liquid; milling for 15 cycles; and a rotation speed of the millstone at 50 rpm.

(3) Natural liquid asphalt and the waste ultrafine cross-linked polyethylene powder obtained in step (2) were added into an internal mixer for mixing to obtain the modified cross-linked polyethylene. Process parameters of the internal mixer are: a mixing temperature controlled at 180° C.: a rotation speed controlled at 50 rpm; time controlled at 10 min; and a mass ratio of the natural liquid asphalt to the waste ultrafine cross-linked polyethylene powder being 0.1: 0.9.

(4) The modified cross-linked polyethylene obtained after the mixing in step (3) was smashed to a composite granular material with an average particle size being 0.5-1 cm.

(5) Single-screw sheet extrusion processing was performed on the composite granular material obtained in step (4) to prepare the recycled product in a form of a sheet material. Process parameters of the sheet extrusion processing are: temperatures of three zones being a first zone of 150° C., a second zone of 175° C. and a third zone of 180° C., a hand piece of 175° C., a rotation speed controlled at 100 rpm, and a die width of 10 cm.

The mechanical property test was performed on the finally prepared recycled product described above as a sample. The tensile strength was 18.7 MPa, and the breaking elongation was 540%.

Example 4

The method for preparing a modified cross-linked polyethylene and a recycled product using waste cross-linked polyethylene and asphalt in the present example includes the following steps.

(1) A waste cross-linked polyethylene material was selected, and the material was smashed to the waste cross-linked polyethylene powder with an average particle size being not more than 1 mm after pretreatment, including washing.

(2) The waste cross-linked polyethylene powder was added into a millstone-type solid-phase force chemical reactor for milling, and a waste ultrafine cross-linked polyethylene powder was collected after milling. Process parameters of the millstone-type solid-phase force chemical reactor are: milling pressure of 3 MPa: a surface temperature of a millstone controlled at 28° C. by introducing a circulating cooling liquid; milling for 15 cycles; and a rotation speed of the millstone at 50 rpm.

(3) Natural liquid asphalt and the waste ultrafine cross-linked polyethylene powder obtained in step (2) were added into an internal mixer for mixing to obtain the modified cross-linked polyethylene. Process parameters of the internal mixer are: a mixing temperature controlled at 180° C.: a rotation speed controlled at 50 rpm; time controlled at 10 min; and a mass ratio of the natural liquid asphalt to the waste ultrafine cross-linked polyethylene powder being 0.1: 0.9.

(4) The modified cross-linked polyethylene obtained after the mixing in step (3) was smashed to a composite granular material with an average particle size being 0.5-1 cm.

(5) Vulcanizing pressure plate processing was performed on the composite granular material obtained in step (4) to prepare the recycled product in a form of a sheet material. Process parameters are: a temperature of 180° C., pressure of 10 MPa, degassing for 5 times, hot pressing for 5 minutes, and cold pressing to a room temperature under pressure of 10 MPa.

The mechanical property test was performed on the finally prepared recycled product described above as a sample. The tensile strength was 18.2 MPa, and the breaking elongation was 527%.

Example 5

The method for preparing a modified cross-linked polyethylene and a recycled product using waste cross-linked polyethylene and asphalt in the present example includes the following steps.

(1) A waste cross-linked polyethylene material was selected, and the material was smashed to the waste cross-linked polyethylene powder with an average particle size being not more than 1 mm after pretreatment, including washing.

(2) The waste cross-linked polyethylene powder was added into a millstone-type solid-phase force chemical reactor for milling, and a waste ultrafine cross-linked polyethylene powder was collected after milling. Process parameters of the millstone-type solid-phase force chemical reactor are: milling pressure of 3 MPa: a surface temperature of a millstone controlled at 28° C. by introducing a circulating cooling liquid; milling for 15 cycles; and a rotation speed of the millstone at 50 rpm.

(3) Natural liquid asphalt and the waste ultrafine cross-linked polyethylene powder obtained in step (2) were added into an internal mixer for mixing to obtain the modified cross-linked polyethylene. Process parameters of the internal mixer are: a mixing temperature controlled at 180° C.: a rotation speed controlled at 50 rpm; time controlled at 10 min; and a mass ratio of the natural liquid asphalt to the waste ultrafine cross-linked polyethylene powder being 0.3: 0.7.

(4) The modified cross-linked polyethylene obtained after the mixing in step (3) was smashed to a composite granular material with an average particle size being 0.5-1 cm.

(5) Single-screw sheet extrusion processing was performed on the composite granular material obtained in step (4) to prepare the recycled product in a form of a sheet material. Process parameters of the sheet extrusion processing are: temperatures of three zones being a first zone of 150° C., a second zone of 175° C. and a third zone of 180° C., a hand piece of 175° C., a rotation speed controlled at 100 rpm, and a die width of 10 cm.

The mechanical property test was performed on the finally prepared recycled product described above as a sample. The tensile strength was 17.2 MPa, and the breaking elongation was 460%.

Example 6

The method for preparing a modified cross-linked polyethylene and a recycled product using waste cross-linked polyethylene and asphalt in the present example includes the following steps.

(1) A waste cross-linked polyethylene material was selected, and the material was smashed to the waste cross-linked polyethylene powder with an average particle size being not more than 1 mm after pretreatment, including washing.

(2) The waste cross-linked polyethylene powder was added into a millstone-type solid-phase force chemical reactor for milling, and a waste ultrafine cross-linked polyethylene powder was collected after milling. Process parameters of the millstone-type solid-phase force chemical reactor are: milling pressure of 3 MPa: a surface temperature of a millstone controlled at 28° C. by introducing a circulating cooling liquid; milling for 15 cycles; and a rotation speed of the millstone at 50 rpm.

(3) Natural liquid asphalt and the waste ultrafine cross-linked polyethylene powder obtained in step (2) were added into an internal mixer for mixing to obtain the modified cross-linked polyethylene. Process parameters of the internal mixer are: a mixing temperature controlled at 180° C.: a rotation speed controlled at 50 rpm; time controlled at 10 min; and a mass ratio of the natural liquid asphalt to the waste ultrafine cross-linked polyethylene powder being 0.3: 0.7.

(4) The modified cross-linked polyethylene obtained after the mixing in step (3) was smashed to a composite granular material with an average particle size being 0.5-1 cm.

(5) Vulcanizing pressure plate processing was performed on the composite granular material obtained in step (4) to prepare the recycled product in a form of a sheet material. Process parameters are: a temperature of 180° C., pressure of 10 MPa, degassing for 5 times, hot pressing for 5 minutes, and cold pressing to a room temperature under pressure of 10 MPa.

The mechanical property test was performed on the finally prepared recycled product described above as a sample. The tensile strength was 17.1 MPa, and the breaking elongation was 435%.

Example 7

The method for preparing a modified cross-linked polyethylene and a recycled product using waste cross-linked polyethylene and asphalt in the present example includes the following steps.

(1) A waste cross-linked polyethylene material was selected, and the material was smashed to the waste cross-linked polyethylene powder with an average particle size being not more than 1 mm after pretreatment, including washing.

(2) The waste cross-linked polyethylene powder was added into a millstone-type solid-phase force chemical reactor for milling, and a waste ultrafine cross-linked polyethylene powder was collected after milling. Process parameters of the millstone-type solid-phase force chemical reactor are: milling pressure of 2 MPa: a surface temperature of a millstone controlled at 35° C. by introducing a circulating cooling liquid; milling for 13 cycles; and a rotation speed of the millstone at 50 rpm.

(3) Natural liquid asphalt and the waste ultrafine cross-linked polyethylene powder obtained in step (2) were added into an internal mixer for mixing to obtain the modified cross-linked polyethylene. Process parameters of the internal mixer are: a mixing temperature controlled at 200° C.: a rotation speed controlled at 30 rpm; time controlled at 30 min; and a mass ratio of the natural liquid asphalt to the waste ultrafine cross-linked polyethylene powder being 0.2: 0.8.

(4) The modified cross-linked polyethylene obtained after the mixing in step (3) was smashed to a composite granular material with an average particle size being 0.5-1 cm.

(5) Twin-screw extrusion processing was performed on the composite granular material obtained in step (4) to prepare the recycled product in a form of a sheet material. Process parameters of the extrusion processing are: a die width of 30 cm, a first zone of 150° C., a second zone of 175° C., a third zone of 180° C., a hand piece of 175° C., and a rotation speed controlled at 50 rpm.

Example 8

The method for preparing a modified cross-linked polyethylene and a recycled product using waste cross-linked polyethylene and asphalt in the present example includes the following steps.

(1) A waste cross-linked polyethylene material was selected, and the material was smashed to the waste cross-linked polyethylene powder with an average particle size being not more than 1 mm after pretreatment, including washing.

(2) The waste cross-linked polyethylene powder was added into a millstone-type solid-phase force chemical reactor for milling, and a waste ultrafine cross-linked polyethylene powder was collected after milling. Process parameters of the millstone-type solid-phase force chemical reactor are: milling pressure of 3 MPa: a surface temperature of a millstone controlled at 25° C. by introducing a circulating cooling liquid; milling for 15 cycles; and a rotation speed of the millstone at 30 rpm.

(3) Natural liquid asphalt and the waste ultrafine cross-linked polyethylene powder obtained in step (2) were added into an internal mixer for mixing to obtain the modified cross-linked polyethylene. Process parameters of the internal mixer are: a mixing temperature controlled at 190° C.; a rotation speed controlled at 40 rpm; time controlled at 20 min; and a mass ratio of the natural liquid asphalt to the waste ultrafine cross-linked polyethylene powder being 0.2: 0.8.

(4) The modified cross-linked polyethylene obtained after the mixing in step (3) was smashed to a composite granular material with an average particle size being 0.5-1 cm.

(5) Injection molding processing was performed on the composite granular material obtained in step (4) to prepare the recycled product in a form of a sheet material. Process parameters of the extrusion processing are: a temperature of a first zone of 160° C., a temperature of a second zone of 190° C., a temperature of a third zone of 190° C. and a temperature of a fourth zone of 190° C.

Comparative Example 1

The method for preparing a recycled product using waste cross-linked polyethylene in this comparative example includes the following steps.

(1) A waste cross-linked polyethylene material was selected, and the material was smashed to the waste cross-linked polyethylene powder with an average particle size being not more than 1 mm after pretreatment, including washing.

(2) The waste cross-linked polyethylene powder was added into a millstone-type solid-phase force chemical reactor for milling, and a waste ultrafine cross-linked polyethylene powder was collected after milling. Process parameters of the millstone-type solid-phase force chemical reactor are: milling pressure of 3 MPa: a surface temperature of a millstone controlled at 28° C. by introducing a circulating cooling liquid; milling for 15 cycles; and a rotation speed of the millstone at 50 rpm.

(3) The waste ultrafine cross-linked polyethylene powder obtained in step (2) was added into an internal mixer for mixing. Process parameters of the internal mixer are: a mixing temperature controlled at 180° C.: a rotation speed controlled at 50 rpm; and time controlled at 10 min.

(4) The cross-linked polyethylene material obtained after the mixing in step (3) was smashed to a cross-linked polyethylene granular material with an average particle size being 0.5-1 cm.

(5) Single-screw sheet extrusion processing was performed on the cross-linked polyethylene granular material obtained in step (4) to prepare the recycled product in a form of a sheet material. Process parameters of the sheet extrusion processing are: temperatures of three zones being a first zone of 150° C., a second zone of 175° C. and a third zone of 180° C., a hand piece of 175° C., a rotation speed controlled at 100 rpm, and a die width of 10 cm.

In the preparation process, there were incomplete melting of powder, loose connection of particle flows, and unstable fluid at the die. Therefore, the extrudate was intermittent and cannot form a continuous sheet material with a smooth surface.

The mechanical property test was performed on the finally prepared recycled product described above as a sample. The tensile strength was 15.2 MPa, and the breaking elongation was 376%.

Comparative Example 2

The method for preparing a recycled product using waste cross-linked polyethylene and asphalt in this comparative example includes the following steps.

(1) A waste cross-linked polyethylene material was selected, and the material was smashed to the waste cross-linked polyethylene powder with an average particle size being not more than 1 mm after pretreatment, including washing.

(2) The waste cross-linked polyethylene powder was added into a millstone-type solid-phase force chemical reactor for milling, and a waste ultrafine cross-linked polyethylene powder was collected after milling. Process parameters of the millstone-type solid-phase force chemical reactor are: milling pressure of 3 MPa: a surface temperature of a millstone controlled at 28° C. by introducing a circulating cooling liquid; milling for 15 cycles; and a rotation speed of the millstone at 50 rpm.

(3) Natural liquid asphalt and the waste ultrafine cross-linked polyethylene powder obtained in step (2) were added into an internal mixer for mixing. Process parameters of the internal mixer are: a mixing temperature controlled at 180° C.: a rotation speed controlled at 50 rpm; time controlled at 10 min; and a mass ratio of the natural liquid asphalt to the waste ultrafine cross-linked polyethylene powder being 0.4: 0.6.

(4) The modified cross-linked polyethylene obtained after the mixing in step (3) was smashed to a composite granular material with an average particle size being 0.5-1 cm.

(5) Single-screw sheet extrusion processing was performed on the composite granular material obtained in step (4) to prepare the recycled product in a form of a sheet material. Process parameters of the sheet extrusion processing are: temperatures of three zones being a first zone of 150° C., a second zone of 175° C. and a third zone of 180° C., a hand piece of 175° C., a rotation speed controlled at 100 rpm, and a die width of 10 cm.

In the preparation process of sheet extrusion, the asphalt between the particle flows moved to the surface under the action of external force, and the residual asphalt on the screw can be seen obviously. In addition, the viscosity was too small, causing serious roll coating and making the processing hard.

The mechanical property test was performed on the finally prepared recycled product described above as a sample. The tensile strength was 14.5 MPa, and the breaking elongation was 350%.

What is claimed is:

1. A preparation method for a modified cross-linked polyethylene, comprising:

obtaining a cross-linked polyethylene powder, comprising:

adding the cross-linked polyethylene powder into a millstone-type solid-phase force chemical reactor for milling; and collecting the cross-linked polyethylene powder after milling; and mixing natural liquid asphalt and the cross-linked polyethylene powder in an internal mixer, wherein:

a milling pressure of the millstone-type solid-phase force chemical reactor is 2-3 MPa;

a surface temperature of a millstone of the millstone-type solid-phase force chemical reactor is controlled at 25-35° C. by introducing a circulating cooling liquid;

the millstone-type solid-phase force chemical reactor mills for 13-15 cycles; and a rotation speed of the millstone is 30-50 revolutions per minute (rpm).

2. The preparation method for a modified cross-linked polyethylene according to claim 1, wherein the circulating cooling liquid is water, ethylene glycol, or glycerol.

3. The preparation method for a modified cross-linked polyethylene according to claim 1, wherein:

a mixing temperature of the internal mixer is 180-200° C.;

a rotation speed of the internal mixer is 30-50 revolutions per minute (rpm);

a duration of the mixing is 10-30 min; and a mass ratio of the natural liquid asphalt to the cross-linked polyethylene powder is (0.1-0.3):(0.9-0.7).

4. The preparation method for a modified cross-linked polyethylene according to claim 1, wherein the natural liquid asphalt has:

a penetration of 50-120 units, wherein one unit is 0.1 mm, a softening point of 42-49° C., a flash point ranging between 240° C. and 260° C., and a ductility of 120-180 cm.

5. The preparation method for a modified cross-linked polyethylene according to claim 1, wherein the natural liquid asphalt is 90 #liquid asphalt.

6. The preparation method for a modified cross-linked polyethylene according to claim 1, wherein obtaining the cross-linked polyethylene powder comprises preparing a waste cross-linked polyethylene powder, comprising:

pretreating a waste cross-linked polyethylene material or product with a proportion of the cross-linked polyethylene being not less than 98% by washing the waste cross-linked polyethylene material or product; and smashing the waste cross-linked polyethylene material or product to form the waste cross-linked polyethylene powder with an average particle size being not more than 1 mm.

7. The preparation method for a modified cross-linked polyethylene according to claim 6, wherein the smashing is smashing to form the waste cross-linked polyethylene powder with an average particle size being not more than 500 μm.

8. A preparation method for a recycled product, comprising:

preparing a modified cross-linked polyethylene by the preparation method according to claim 1;

smashing the modified cross-linked polyethylene to obtain a composite granular material; and performing thermoplastic processing on the composite granular material to prepare the recycled product.

9. The preparation method for a recycled product according to claim 8, wherein the modified cross-linked polyethylene is smashed to the composite granular material with an average particle size being 0.5-1 cm.

10. The preparation method for a recycled product according to claim 8, wherein the thermoplastic processing comprises extruded profile processing, injection molding processing, or calendaring.

11. The preparation method for a recycled product according to claim 8, wherein the thermoplastic processing is selected from a group consisting of:

single-screw sheet extrusion processing on the composite granular material, wherein a temperature of a first zone is 150° C., a temperature of a second zone is 175° C., a temperature of a third zone is 180° C., a temperature of a hand piece is 175° C., a rotation speed is 50-100 revolutions per minute (rpm) and a die width of 10 cm;

twin-screw extrusion processing on the composite granular material, wherein a die width is 30 cm, a temperature of a first zone is 150° C., a temperature of a second zone is 175° C., a temperature of a third zone is 180° C., a temperature of a hand piece is 175° C. and a rotation speed is 50-100 rpm;

vulcanizing pressure plate processing on the composite granular material, wherein a temperature is 180° C. and pressure is 10 MPa, and comprising degassing for 5 times, hot pressing for 5 minutes and cold pressing to a room temperature under pressure of 10 MPa; or injection molding processing on the composite granular material, wherein a temperature of a first zone is 160° C., a temperature of a second zone is 190° C., a temperature of a third zone is 190° C. and a temperature of a fourth zone is 190° C.

* * * * *